United States Patent

Schenfeld et al.

[11] Patent Number: 6,034,821
[45] Date of Patent: Mar. 7, 2000

[54] OPTOMECHANICAL COMPONENTS FOR USE AS OPTICAL INTERCONNECTS

[75] Inventors: Eugen Schenfeld, South Brunswick; David T. Neilson; Tae J. Kim, both of Plainsboro, all of N.J.

[73] Assignee: NEC Research Institute, Inc., Princeton, N.J.

[21] Appl. No.: 08/925,822

[22] Filed: Sep. 5, 1997

[51] Int. Cl.[7] .............................. G02B 27/10; G02B 5/04; G02B 6/34
[52] U.S. Cl. .................. 359/618; 359/626; 359/636; 359/831; 359/837; 385/36; 385/136; 385/137; 385/147
[58] Field of Search ..................... 359/431, 495, 359/496, 626, 633, 636, 638, 640, 831, 833, 834, 837, 618, 629; 385/31, 36, 147, 136, 137, 135

[56] References Cited

U.S. PATENT DOCUMENTS

| 3,511,556 | 5/1970 | Ammann | 359/495 |
|---|---|---|---|
| 3,712,622 | 1/1973 | Odier . | |
| 4,026,065 | 5/1977 | Dick . | |
| 4,522,402 | 6/1985 | Henry . | |
| 4,789,214 | 12/1988 | Vilhelmsson et al. . | |
| 5,168,677 | 12/1992 | Pronsato et al. . | |
| 5,369,529 | 11/1994 | Kuo et al. . | |
| 5,414,819 | 5/1995 | Redmond et al. | 395/325 |
| 5,458,495 | 10/1995 | Stone . | |
| 5,560,151 | 10/1996 | Roberts . | |
| 5,619,359 | 4/1997 | Redmond et al. | 359/117 |
| 5,818,997 | 10/1998 | Fasanella et al. | 385/147 |

*Primary Examiner*—Ricky D. Shafer
*Attorney, Agent, or Firm*—Arthur J. Torsiglieri; Andrew G. Isztwan

[57] ABSTRACT

Optical components that are designed to be coupled together in modular fashion to form an optical network. The components are shaped so that a plurality of components can be coupled together to form a light cube. The components are provided with mating means to permit easy coupling. The preferred form of component is a right-angled triangular prism that can be coupled together with a similar prism to form a cube.

26 Claims, 6 Drawing Sheets

OPTOMECHANICAL COMPONENTS FOR USE AS OPTICAL INTERCONNECTS

FIELD OF INVENTION

The present invention relates to optical transmission and more particularly to optomechanical components that can be assembled together in modular fashion.

BACKGROUND OF THE INVENTION

In an earlier application entitled "Modular Building Block for an Optical Interconnection Network", Ser. No. 08/812,625, filed Mar. 7, 1997 by Kenneth J. Fasanella, T. J. Kim, David Neilson and Eugen Schenfeld, and having a common assignee as this application, there are described optomechanical components for use in free space optical networks.

Other examples of electrooptic and optical components useful in free space optical networks are described in U.S. Pat. No. 5,414,819 entitled "Optical Interconnect Network", in U.S. Pat. No. 5,619,359 entitled "Optoelectronic Apparatus", and in pending U.S. Pat. application Ser. No. 08/558,352, filed Nov. 16, 1995 entitled "Optoelectronic Apparatus."

One of the factors limiting the use of optics in systems of the kind mentioned are the high costs of the optical components and of their assembly in such systems. Much of the cost of assembly is related to the difficulty of alignment of such components to the close tolerances required for optimum use of such components. For optics to make major inroads transmission networks there is a need for optical components that are both low in cost and readily amenable to easy assembly.

The present invention seeks to present a solution to these needs.

SUMMARY OF THE INVENTION

From a broad aspect, the invention involves optomechanical components of a material and of a geometry that can be made to high precision, for example, tolerances of several microns, and at low cost, for example by injection plastic molding or similar process, and that can be readily assembled with like components to form devices useful, for example in optical systems. In particular, a basic component in accordance with the invention comprises a prism that, when coupled with one or more similar prisms forms a structure that can be readily coupled to similar structures to form an optical network. Of special interest is a right angle triangular prism that when combined with a similar prism forms a cube. Such a prism includes a pair of surfaces that are essentially square, a hypotenuse surface that is essentially rectangular, and a pair of passive surfaces that are essentially right triangles. Another geometry of particular interest is a four-sided pyramid having a square base and four equilateral sides. Six of such pyramids can similarly be assembled to form a cube. A particularly useful property of cubes so formed is that they provide oblique internal surfaces that can be made reflective to split or redirect incident beams. Additionally one or more of the surfaces of each of such prisms is provided with male and/or female coupling means, such as pins and holes, that permit the prisms to be conveniently coupled together in desired alignments with close tolerances.

Additionally, such a prism typically will include at least one surface in which there is included an indented, or inset, region where there may be positioned a microlens array or other similar optical element.

In particular, in the preferred basic component comprising a right-angled triangular prism, each of the square surfaces includes, at least in one corner, a mating pin and, at least in one other corner, a mating hole or socket. Additionally, typically, at least one of its two square surfaces includes an indented, or inset, region into whose surface there is molded a microlens array. Additionally, the rectangular, hypotenuse surface supports a two dimensional array of micromirrors of which selected mirrors can be made either opaque, partially reflective, or transmissive to incident light for use in beam control. Alternatively, such a surface may be provided with a coating, grating or hologram that will provide a prescribed reflective, refractive or diffractive function with respect to incident light.

Typically, in such a prism, the inset region is about 4.5 by 4.5 millimeters square and is centered in the cube face and two such prisms can be combined to form a cube of about one-centimeter at each edge.

The material used to form the bulk of the prism is chosen to be essentially transparent at the wavelengths of the light being used for transmitting the signal information. It also should be amenable to injection molding, or like manufacturing technology, that will permit low cost fabrication to the high precision desired, typically to tolerances of about several microns.

Additionally, each prism of the kind described, that includes a surface with an inset, advantageously includes at such surface, a perimeter region surrounding the inset where there can be provided circuitry for the control of arrays of optical elements, such as lasers, photodetectors or fiber interconnections that are supported at such inset.

In its broader aspect, the invention contemplates a wide variety of optomechanical components that can be used in a modular system of the kind described and that have in common the properties of being easily coupled in accurate alignment for ready assembly and also able to be made by processes, such as injection molding, to be of low cost and able to meet close tolerances.

Modules of the kinds described can be assembled in a variety of ways for use in a wide variety of optical applications, as will appear from the more detailed description that follows when taken in connection with the accompanying drawing.

DETAILED DESCRIPTION

Figure 1:
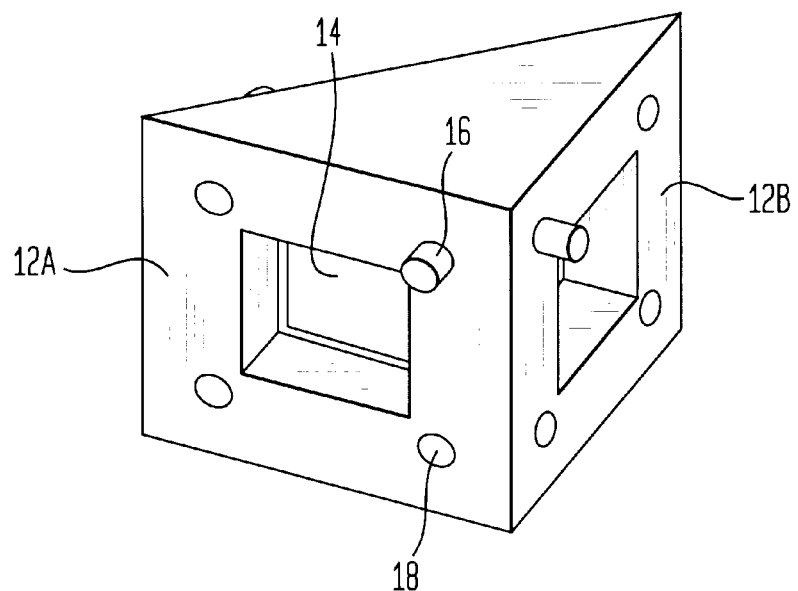
FIGS. 1 and 2 are two views of a prism of the kind that forms the preferred building block or component in accordance with the invention.
Figure 2:
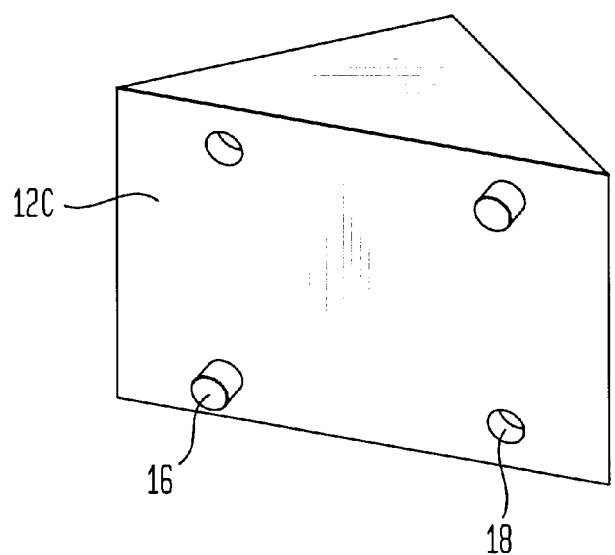

With reference now to the drawings, the right-angled triangular prism shown in FIGS. 1 and 2 includes a pair of square faces 12A and 12B, a rectangular hypotenuse surface 12C and upper and lower triangular surfaces not numbered. The square faces 12A, 12B are each provided with a centered square inset 14. The surfaces 12A, 12B and 12C are provided near each corner with either a mating pin 16 or mating hole or socket 18. Typically a square face will have one pin and three holes, while a rectangular face will have two pins and two holes. The pins and holes are all located with high precision to serve as the alignment means as prisms are coupled together to form a modular arrangement. Each pin typically may be several millimeters both in diameter and in length and the holes sized appropriately to provide a stable tight fit with the pins that may be inserted therein.

In some instances where more permanent couplings are desired, adhesives may be used to provide additional coupling.

The insets are adapted to support various optical components, depending on the role to be played by the particular prism. Some of the prisms will serve as light sources for transmitting signal information, in which case an inset might be provided with a microlaser array. Alternatively or additionally, a prism might be adopted to support either alternatively or additionally a receiver, in which case an inset might be provided with an array of photodiodes. Additionally, it may be desirable to include a microlens array to augment the role of such microlasers or microphotodiode arrays.

Additionally, some of the prisms will be provided with beam splitting or beam redirecting means at their hypotenuse surface. Such means may be arrays of mirrors of various forms, such as molded refractive or defractive mirrors, or spherical or aspherical of-axis mirrors. Such mirrors can be used to couple light beams into or exit from channels.

Figure 3:
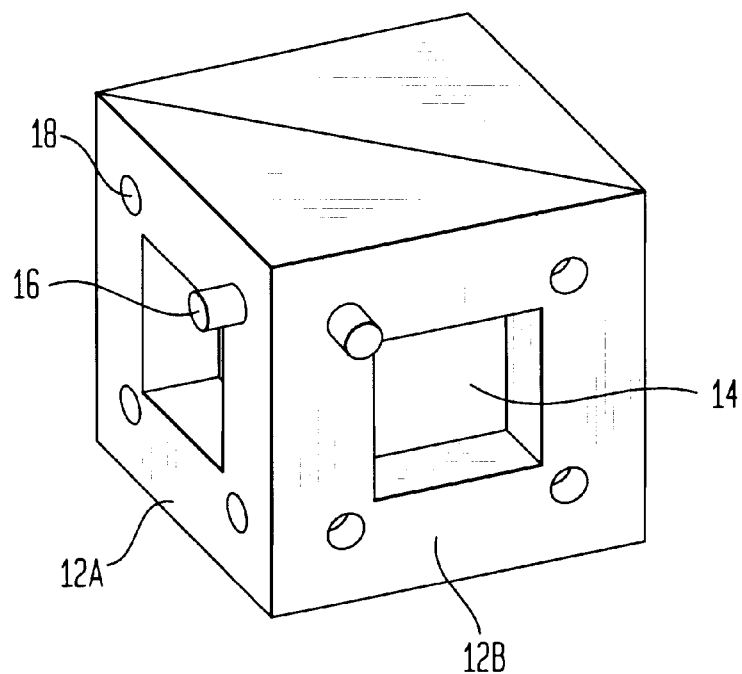
FIG. 3 is a perspective view showing a pair of prisms of the kind shown in FIG. 1 coupled together to form a cube of the kind that forms a basic component in accordance with the invention.
Figure 4:
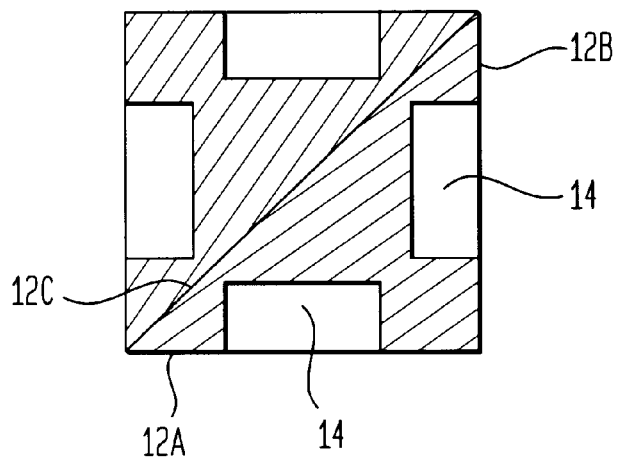
FIG. 4 shows a cross section of a cube of the kind shown in FIG. 3.

FIG. 3 shows in perspective view a pair of prisms of the kind shown in FIGS. 1 and 2, coupled together to form a light cube and FIG. 4 is a cross section from a top view of such a light cube where, 12C is the hypotenuse surface where there typically will be provided beam redirecting or splitting localized surface regions as previously discussed.

In particular, two-dimensional arrays of microlenses with one optical beam per lenslet form a highly suitable optical relay for a lens waveguides. Since at all points along the beam paths, each beam is distinct and its position in the array remains constant along the lens waveguide. Optical routing can be readily performed by partial beam splitting mirrors at the rectangular hypotenuse surfaces when fan-in and fan-out of optical beams are desired and by patterned mirrors where routing is required.

This permits a wide variety of optical wiring patterns that can be configured in the hardware for various purposes. Moreover, the peripheral border portion of each square surface of a prism can be used to support the electrical circuitry of the associated individual microlaser transmitters or rnicrodiode receivers, or other means used to fan signals into the waveguide or select receiver signals that are fanned out of the waveguide.

The fan-in of a beam into a path destined for travel to an assigned receiver can be controlled by excitation of an appropriate laser of the microlaser array aimed at a particular mirror in the array of mirrors at the beam combining surface.

The fan-out of a beam from its path along the waveguide to a selected receiver can be controlled by appropriate locations of a beam redirecting mirror aimed at the appropriate microdiode of the microdiode array at the called station along the waveguide.

Figure 5:
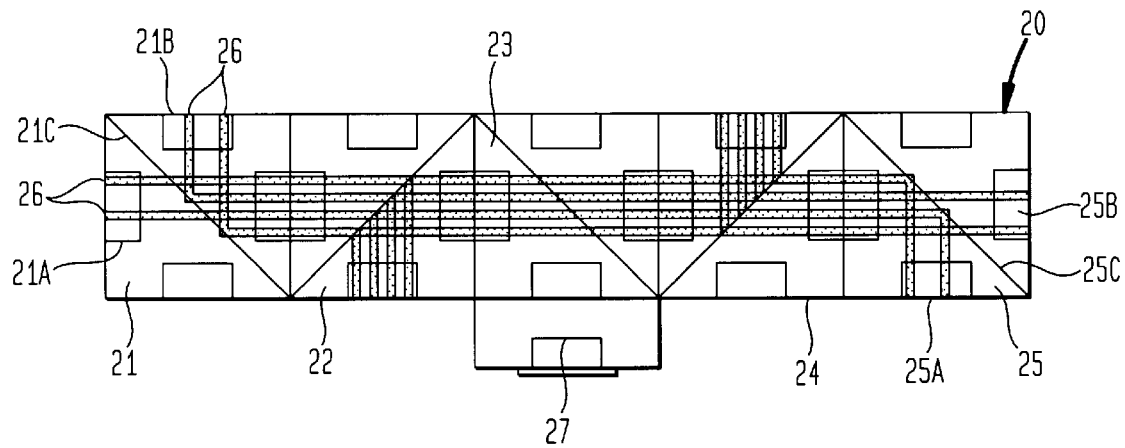
FIG. 5 shows a portion of a typical optical network formed with components in accordance with the invention.

FIG. 5 illustrates the use of a plurality of light cubes 21–25 coupled together to form an optical network. In particular, light cube 21 is provided at insets 21A and 21B with microlasers that are used to form light beams 26 that are redirected at its hypotenuse surface 21C for longitudinal travel through the network, for example to light cube 25 where the beams are redirected by its hypotenuse surface 25C into receivers at insets 25A and 25B. Similarly, light cubes 22 and 24 similarly can be used to transmit or to receive additional light beams from the network.

Figure 6:
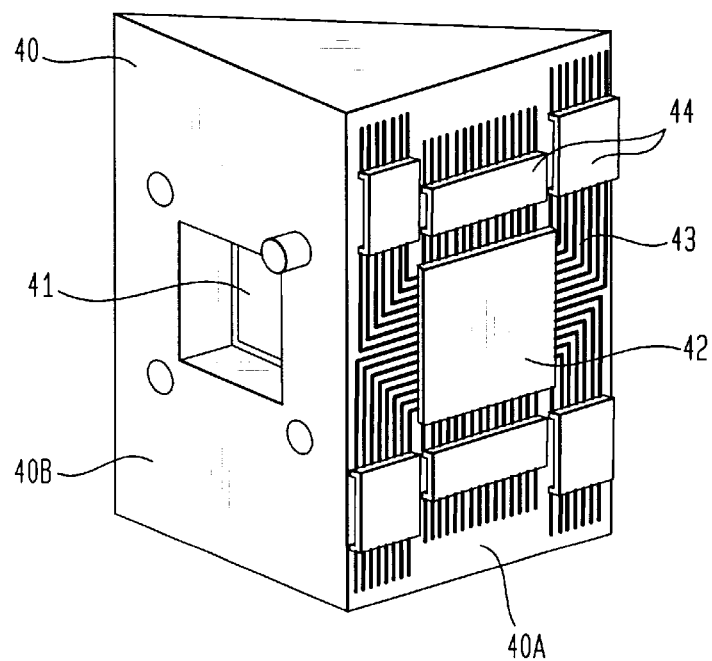
FIG. 6 illustrates electronic and electro-optic devices supported on a prism.

FIGS. 6 shows how various circuit components can be supported on a prism 40 of the kind described. In particular, an electrooptic package 42, for example a package including an array of microlasers useful as transmitters, is positioned on surface 40A at an inset (hidden) but similar to inset 41, on adjacent surface 40B, and other packages 44 including integrated circuit devices are positioned around package 42 on printed circuits 43. The integrated circuit devices provide the electronics needed to control the electrooptic devices. Alternatively, the electrooptic package could include an array of photodetectors for use as receivers.

Figure 7:
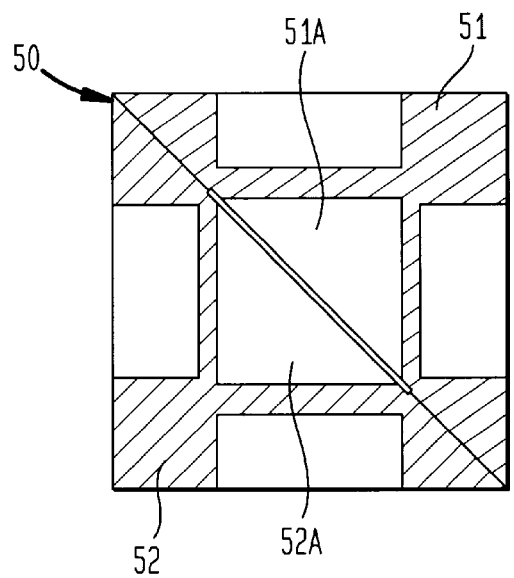
FIG. 7 shows a cross section of a cube formed by a pair of prisms of slightly modified form.

FIG. 7 shows in cross section a light cube 50 that is formed by combining a pair of prisms 51, 52 of slightly modified form. In this instance, each of the prisms also includes an insert 51A, 52A hollowed out of its hypotenuse surface where there may be supported additional control circuitry. Again typically an array of mirrors or microlens for control of the beam directions will be positioned intermediate between prisms 51, 52.

Figure 8:
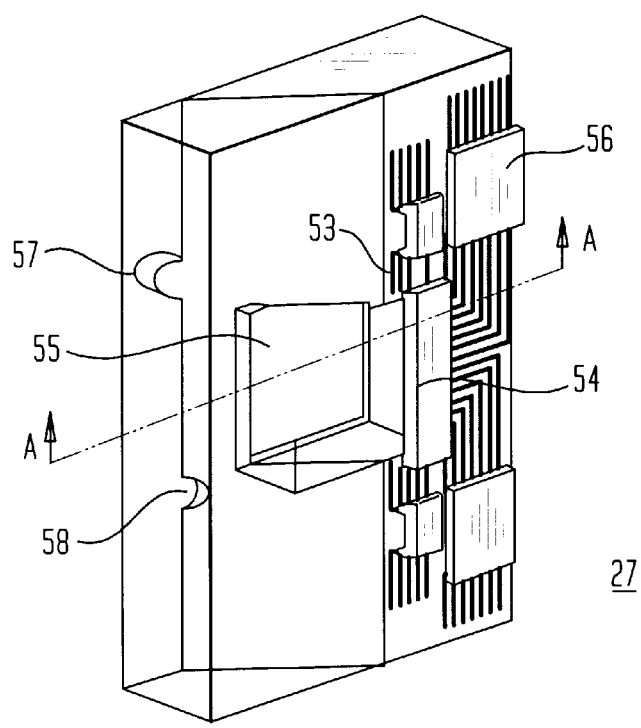
FIG. 8 illustrates a plug-in module for coupling to a beam waveguide.
Figure 9:
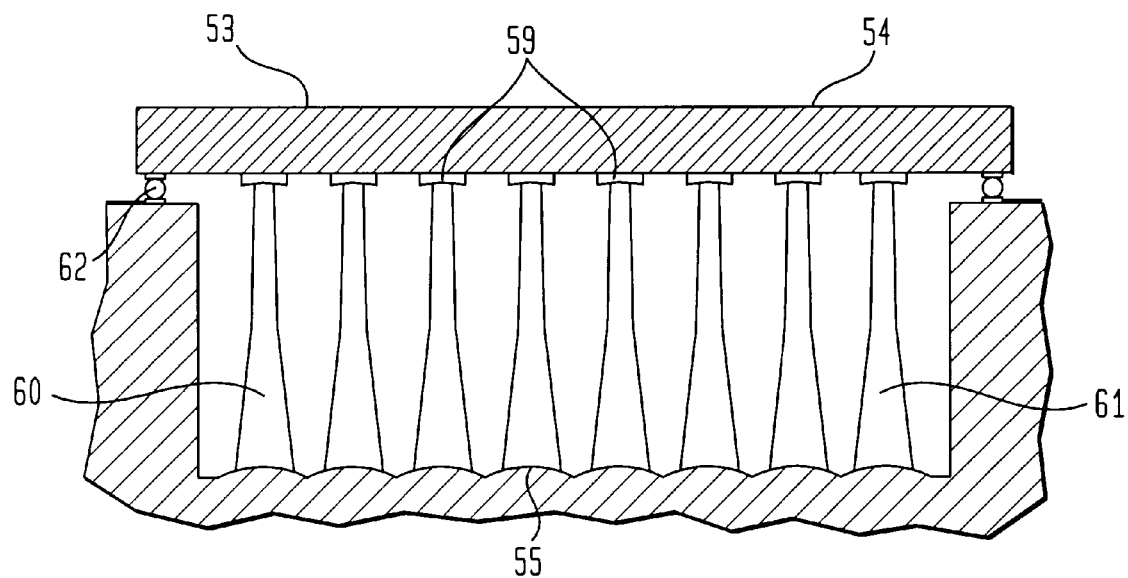
FIG. 9 is a cross section along line A—A in FIG. 8.
Figure 10:
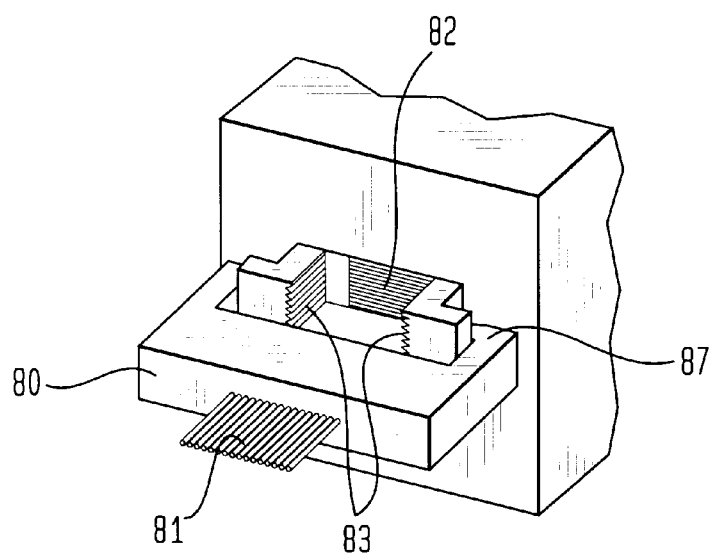
FIG. 10 illustrates a portion of a connector module.

FIGS. 8, 9 and 10 illustrate a plug-in module 27 and a connector module 80 that can be used to connect an electrooptic device or an array of optical fibers to a light cube for coupling light beams either into or out of a lens waveguide 20 of the kind shown in FIG. 5. A rectangular plug-in module 27 is shown in FIG. 8 and includes electrooptic package 54, integrated circuit device 56 and a lenslet array 55 which is preferably molded into the module 27. In FIG. 5 the alignment of the central horizontal axis of the relay system is critical because of any misalignment will result in beam propagation errors. The plug-in module 27 may include active elements such as transmitters or receivers or optical fibers. The module is replaceable without modifying the basic network beam propagation path through light cubes 21–25. The alignment of module 27 is not as critical as the alignment of cubes 21–25. Male and female mating means 57, 58 cooperatively engage corresponding female and male mating means located on the surface of component 23. The mating of module 27 in the described manner allows light beams to enter or exit the network in FIG. 5.

FIG. 9 is a cross section view of the module 27 along section line A—A. Attached to the surface of electrooptic package 54 is an array 59 of receivers, e.g. photodiode, and/or transmitters, e.g. VCSEL, for receiving light beam 60 from and transmitting light beam 61 to lenslet array 55. The lenslet array focuses the light beams into or from the lens waveguide.

In order to provide accurate alignment of the array 59, a solder bump 62 is used to connect the electrooptic package 54 to the conductors 53 on the surface of the plug-in module 27 by flip-chip bonding.

In FIG. 10, the connector 80 includes a plastic board that supports a row of optical fibers 81. The side walls of the inset in the light cube member is provided with a stack, for example, of V-shaped grooves 83 and the side edges of the plastic board are provided with similar matching grooves so that the plastic board can be slid into the inset to position the free ends of the optical fibers at the focal points of microlenses of a microlens array 82 in the light cube. A particular set of channels in the beam waveguide can be addressed by the choice of the height in the inset of the grooves into which the plastic board is inserted. Advantageously, the connector also includes a pair of spring clips 87 that can be fitted against shoulders 88 provided for the purpose in the light cube.

Alternatively, by suitable modification, a vertical column of fibers could be connected to the light cube to couple to a vertical column of light beams in the beam waveguide. Moreover, a two-dimensional array of fibers could similarly be connected to the beam waveguide.

Figure 11:
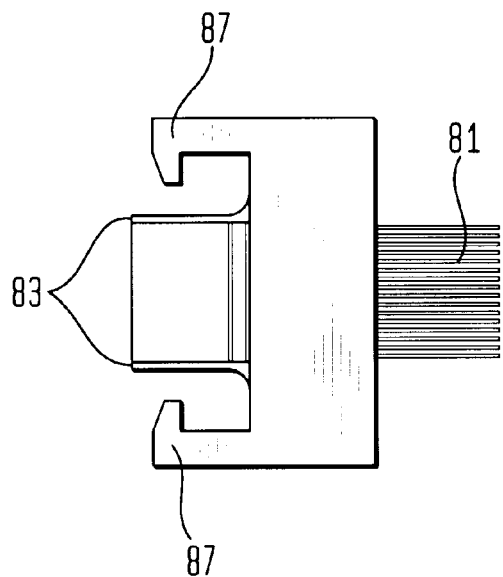
FIG. 11 is a plan view of a portion of the connector module shown in FIG. 10.
Figure 12:
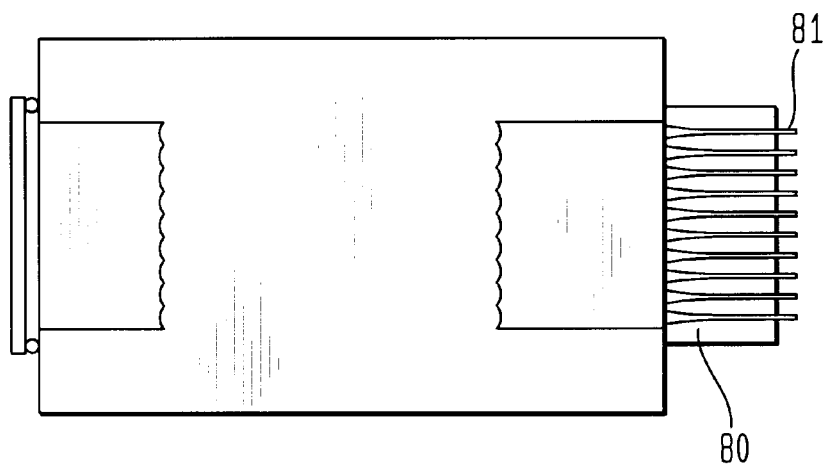
FIG. 12 illustrates a connector module for use with optical fibers of increasing diameter.

To improve the efficiency of the coupling between fibers, which are typically single mode fibers, and the microlenses as shown in FIG. 11 it maybe desirable to increase gradually the diameter of each fiber 81 as its free end is approached to increase the size of the light spot radiated at the free end of the fiber to relax the precision needed to align the fiber end with the focal point of the desired microlens in the array 82. A connector module for use with such fibers is shown in FIG. 12. The effect of tapering the fiber from a multimode core radius, of e.g., 50 microns, to a single mode core, e.g. 6 microns, allows for very efficient coupling from free space into a single mode fiber.

It can readily be appreciated that a complete beam waveguide network can be readily assembled with modules of the kind described. Alternatively, a group of such modules can be coupled together to form a limited portion of a much larger system only part of which is traversed over free space under control of a beam waveguide, as is known in the art.

It should also be appreciated that various other shapes can be combined to form light cubes. In particular, six pyramids each with a square base and four equilateral triangular surfaces can be combined to form a cube. Similarly a triangular cube of the kind shown in FIG. 1 could be sliced in half, leaving the square surfaces intact and creating a new pair of hypotenuse surfaces where an inset may be provided for supporting additional optical elements.

Accordingly, it is to be appreciated that the specific embodiments depicted are merely illustrations of the general principles of the invention.

What is claimed is:

1. An optical component for use as a modular building block in an optical network including a plurality of optical components, the optical component comprising:
   at least one prism-shaped element of a material that is optically transparent and amenable to being shaped to a high degree of accuracy and including a pair of substantially similar input and output surfaces and a third surface, at least one of the input and output surfaces including a central inset opening; and
   a combination of female and male mating means, separate from said central inset opening, provided on one or more of the surfaces of each prism-shaped element to permit the coupling together with a high degree of alignment of each prism-shaped element with at least one other said prism-shaped element such that light may be accurately directed between the at least one prism-shaped element and at least one other coupled prism-shaped element.

2. The optical component of claim 1, wherein at least one of the input and output surfaces includes in the inset an array of microlenses focused to the third surface.

3. The optical component of claim 1, wherein the third surface supports an array of beam directing means for redirecting incident light in a prescribed pattern.

4. The optical component of claim 1, wherein the inset of the at least one of the input and output surfaces includes an array of microlenses focused on the third surface, and the third surface includes an array of beam directing means for redirecting incident light in a prescribed pattern and aligned with the array of microlenses.

5. The optical component of claim 1, wherein the prism-shaped element is a right-angled triangular prism.

6. The optical component of claim 1, wherein the optical component includes at least first and second prism-shaped elements, and wherein respective hypotenuse surfaces of the two prism-shaped elements are positioned opposite one another, the two prism-shaped elements being coupled together by their female and male mating means.

7. The optical component of claim 6, wherein at least one of the input and output surfaces of one of the at least two prism-shaped elements supports an array of transmitting or receiving means for, respectively, transmitting light out of, or receiving light directed into, the optical component.

8. The optical component of claim 6, wherein an input surface of a first of the at least two prism-shaped elements includes an array of transmitting means for transmitting light out of the first prism-shaped element, and an output surface of a second of the at least two prism-shaped elements includes an array of receiving means for receiving light directed into the prism-shaped element from the transmitting means of the first prism-shaped element.

9. The optical component of claim 6, wherein the third surface of each prism-shaped element supports an array of beam directing means for redirecting incident light in a prescribed pattern.

10. An optical network comprising a plurality of optical components of claim 1 coupled together in a modular assembly.

11. The optical network of claim 10, further comprising means for supporting an array of optical fibers, said means being V-grooved in a manner to match V-grooves in walls of the central inset opening in one of the surfaces of the prism-shaped element.

12. The optical network of claim 11, wherein the means for supporting an array of optical fibers includes spring clip means for coupling to the prism-shaped element.

13. The optical network of claim 11, wherein the optical fibers of the array have a free end of increasing diameter.

14. The optical network of claim 13, wherein the free ends of the fibers are positioned to couple radiatively with microlenses supported on the hypotenuse surface of a right angled triangular prism-shaped element.

15. An information processing system comprising a plurality of optical components of claim 1 coupled together in a modular assembly.

16. An optical network comprising:
   a plurality of prism-shaped elements of a material that is optically transparent and amenable to being shaped to a high degree of accuracy and each of said elements including a pair of substantially similar input and output surfaces and a third surface, at least one of the input and output surfaces including a central inset opening; and each of said elements having a combination of female and male mating means, separate from said central inset opening provided on one or more of the surfaces for coupling together said plurality of elements with a high degree of alignment such that light may be accurately directed between coupled prism-shaped elements.

17. The optical network of claim 16, further comprising a plug-in module having female and male mating means provided on a surface coupling said plug-in module to one of said elements.

18. An optical component for use as a modular building block in an optical network including a plurality of said optical components, the optical component comprising:

at least one prism-shaped element of a material that is optically transparent and amenable to being shaped to a high degree of accuracy and including a pair of substantially similar input and output surfaces and a third surface, at least one of the input and output surfaces including a central inset opening, wherein at least one of the input and output surfaces includes in the inset an array of microlenses focused to the third surface; and a combination of female and male mating means provided on one or more of the surfaces of each prism-shaped element to permit the coupling together with a high degree of alignment of each prism-shaped element with at least one other said prism-shaped element.

19. The optical component of claim 18, wherein the third surface supports an array of beam directing means for redirecting incident light in a prescribed pattern.

20. The optical component of claim 18, wherein the inset of the at least one of the input and output surfaces includes an array of microlenses focused on the third surface, and the third surface includes an array of beam directing means for redirecting incident light in a prescribed pattern and aligned with the array of microlenses.

21. The optical component of claim 18, wherein the prism-shaped element is a right-angled triangular prism, wherein the optical component includes at least first and second prism-shaped elements, and wherein respective hypotenuse surfaces of the two prism-shaped elements are positioned opposite one another, the two prism-shaped elements being coupled together by their female and male mating means, and wherein at least one of the input and output surfaces of one of the at least two prism-shaped elements supports an array of transmitting or receiving means for, respectively, transmitting light out of, or receiving light directed into, the optical component.

22. The optical component of claim 18, wherein the prism-shaped element is a right-angled triangular prism, wherein the optical component includes at least first and second prism-shaped elements, and wherein an input surface of a first of the at least two prism-shaped elements includes an array of transmitting means for transmitting light out of the first prism-shaped element, and an output surface of a second of the at least two prism-shaped elements includes an array of receiving means for receiving light directed into the prism-shaped element from the transmitting means of the first prism-shaped element.

23. The optical component of claim 18, wherein the prism-shaped element is a right-angled triangular prism, wherein the optical component includes at least first and second prism-shaped elements, and wherein the third surface of each prism-shaped element supports an array of beam directing means for redirecting incident light in a prescribed pattern.

24. An optical network comprising a plurality of optical components of claim 18, coupled together in a modular assembly, further comprising means for supporting an array of optical fibers, said means being V-grooved in a manner to match V-grooves in walls of the central inset opening in one of the surfaces of the prism-shaped element.

25. The optical network of claim 24, wherein the means for supporting an array of optical fibers includes spring clip means for coupling to the prism-shaped element.

26. The optical network of claim 24, wherein the optical fibers of the array have a free end of increasing diameter.

* * * * *